March 11, 1952  C. C. MINTER  2,588,403
COMPENSATED CONVECTION CURRENT RESPONSIVE INSTRUMENT
Filed April 3, 1950
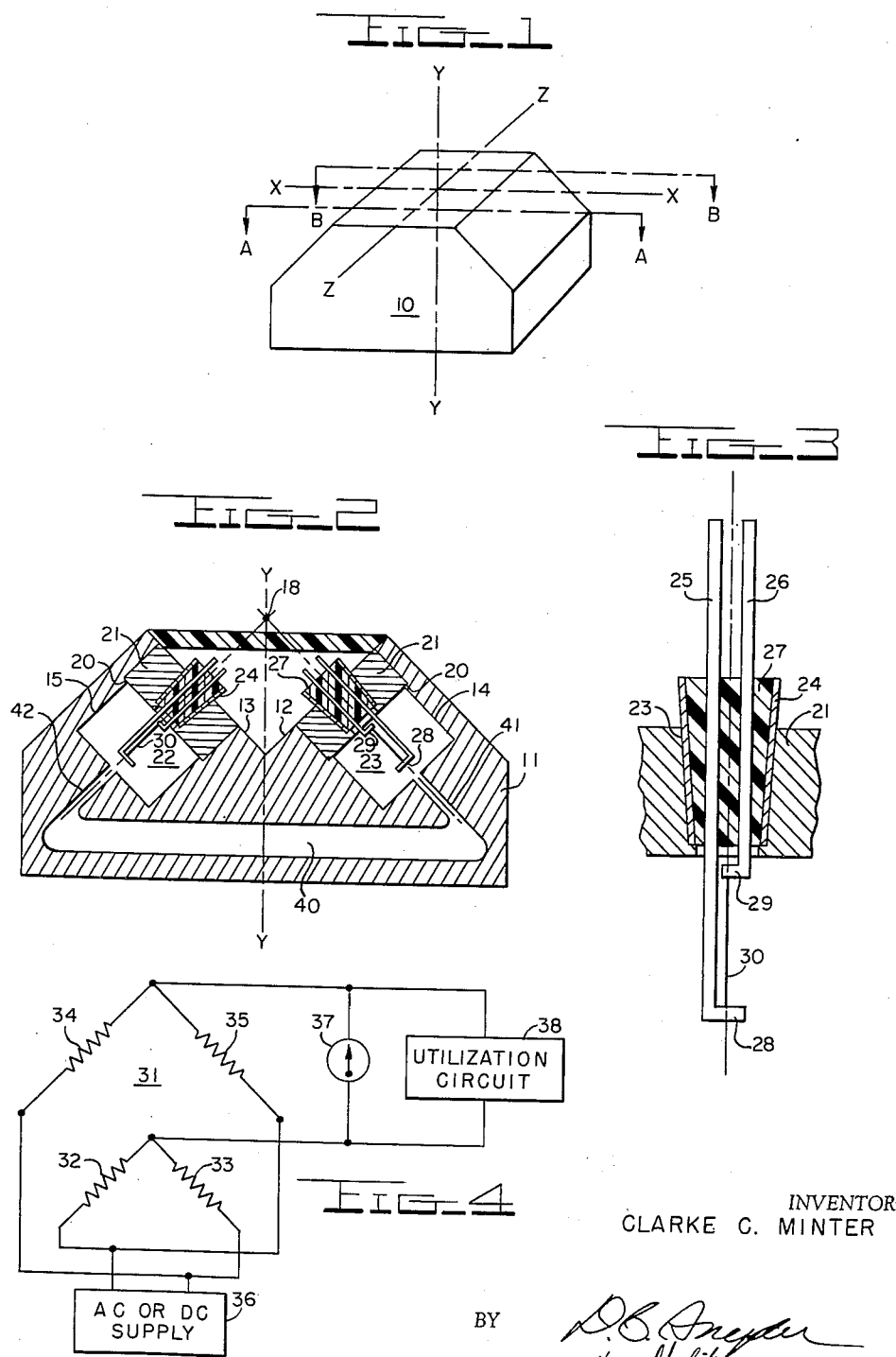
INVENTOR
CLARKE C. MINTER Patented Mar. 11, 1952

2,588,403

UNITED STATES PATENT OFFICE 2,588,403

COMPENSATED CONVECTION CURRENT RESPONSIVE INSTRUMENT

Clarke C. Minter, Washington, D. C.

Application April 3, 1950, Serial No. 153,681

6 Claims. (Cl. 201—48)

(Granted under the act of March 3, 1883, as amended April 30, 1928; 370 O. G. 757)

This invention relates to convection current responsive instruments and more particularly to instruments producing indications responsively to convection current deviations related to a preselected function and non-responsively to convection current deviations resulting from spurious quantities including acceleration.

Convection current responsive instruments generally employ a pair of electrically heated filaments each enclosed in a gas-filled cavity structure, or a gas-filled envelope enclosing a pair of planar conductors equally spaced from a heated filament, wherein the direction of the convection currents relative to the filament or conductors determines their temperatures and hence their resistance. By employing a suitable bridge circuit, and by precisionally constructing the instrument, an output potential may be obtained in response to the position of convection currents resulting from rotation of the instrument about a single axis thereof, and non-responsive to other deviations of the instrument.

In addition to the inability to precisionally construct these instruments due to design details thereof, they are incapable of providing output potentials solely responsive to convection current deviations resulting from a single function, such as rotation of the instrument about a predetermined axis. For these instruments are inherently responsive to shock forces and to forces of acceleration applied thereto in the directions to which the instruments are sensitive, inasmuch as such forces deviate the convection currents.

It is therefore an object of the present invention to provide a novel convection current responsive instrument for producing an absolute indication of only one preselected function.

Another object is to provide a convection current responsive instrument of novel design allowing precisional manufacture thereof.

Another object is to provide a convection current responsive instrument of novel design providing a rugged construction having smaller over-all dimensions and of less weight than instruments provided heretofore, yet capable of producing an output potential of a magnitude at least equal to that of conventional instruments for a given convection current deviation.

Still another object of the present invention is to provide a convection current responsive instrument including novel means compensating for the effects of acceleration and other spurious forces on the indications provided thereby.

Still another object is to provide a novel convection current responsive instrument of the type for indicating deviations thereof about a single axis including novel means compensating for convection current deviations resulting from other forces applied to the instrument.

Still another object is to provide a novel convection current responsive instrument wherein the effective convection current intensity is controlled to compensate for spurious convection current deviations.

Other objects and features of the present invention will appear more fully hereinafter from the following detailed description considered in connection with the accompanying drawings which discloses several embodiments of the invention. It is to be expressly understood however, that the drawings are designed for purposes of illustration only and not as a definition of the limits of the invention, reference for the latter purpose being had to the appended claims.

In the drawings, wherein similar reference characters denote similar elements throughout the several views:

Fig. 1 is a perspective showing of a convection current responsive instrument embodying the principles of the present invention;

Fig. 2 is a cross-sectional illustration through lines A—A and B—B of Fig. 1;

Fig. 3 is a sectional illustration showing a portion of the instrument in greater detail, and Fig. 4 is an electric circuit diagram of the preferred embodiment of the present invention.

It is contemplated by the present invention to provide a convection current responsive instrument comprising a plurality of compactly assembled gas-filled convection current devices of a novel design electrically interconnected with each of the sensitive elements forming an arm of a resistance bridge circuit so that a useful output potential is produced only in response to deviations of the instrument about a single predetermined axis. In order to prevent variations of the output potential responsively to spurious quantities which effect the convection current devices, such as shock and acceleration forces applied to the instrument in a direction of rotation about its sensitive axis, the present invention also provides novel compensating means for varying the effective convection current intensity of the devices in direct proportion to the convection current deviations caused by the spurious quantities. This feature of the present invention depends for its operation on the fact that effective convection current intensity varies directly with the pressure of the gaseous convection current medium, and the compensation is effected by providing a volume of gas externally of the convection current devices positioned to be influenced by the spurious quantities producing the undesired convection current deviations. This volume of gas is in such constant communication with the convection current devices so that whenever the resistance of a sensitive element would vary in response to a spurious quantity the pressure of the gas within the device is increased or decreased, as the case may be, by the proper magnitude to vary the effective convection current intensity and compensate or negative the effects of the spurious convection current deviation.

A convection current responsive instrument embodying the foregoing features of the present invention is shown in Fig. 1 of the drawings, generally designated by reference numeral 10. The instrument 10 is designed to produce accurate sense indications of its deviation about the axis Z—Z, hereinafter referred to as the sensitive axis, wholly non-responsive to its position relative to the vertical axis Y—Y and the horizontal axis X—X. The preferred embodiment of the present invention employs two pairs of convection current devices, in the form of gas-filled thermal conductivity cells. The longitudinal axis of one pair lies in a plane passing through line B—B perpendicular to the sensitive axis, while the longitudinal axis of the other pair lie in a plane passing through line A—A parallel to and spaced from the plane of the first pair.

The relative positions of the convection current devices comprising each pair, as well as the design and construction characteristics of all of the devices, are illustrated in Fig. 2 of the drawings. As shown therein, the instrument 10 comprises a metallic housing 11 of substantial rectangular configuration having unnecessary portions therein cut away to reduce the dead weight of the instrument. A 90 degree V-shaped channel is cut in the upper surface of the casing 11, as viewed in the drawing, throughout its dimension of the sensitive axis. The V-shaped channel is cut symmetrical with respect to the vertical axis so that the angular surfaces 12 and 13 thereof are equally disposed on opposite sides of a plane passing through the vertical and sensitive axes. Cylindrical cavities 14 and 15 are provided in the surfaces 12 and 13, respectively, with their central longitudinal axes perpendicular to the respective surfaces 12 and 13 and intersecting the sensitive axis Z—Z at a common point 18.

The cylindrical cavities 14 and 15 comprise chambers for one pair of thermal conductivity cells. Novel means are provided for supporting a sensitive element, such as a thin resistance wire, in each cavity coincident with the central longitudinal axis thereof, and for closing the open ends of the cylindrical cavities to define identical gas-tight cylindrical chambers.

The cylindrical walls of the cavities 14 and 15 adjacent the inclined surfaces 12 and 13 are provided with a greater diameter than the remaining wall portions thereof to define circumferential shoulders 20—20 precisionally located with respect to the closed ends of the cavities. Circular discs 21—21 are positioned in the enlarged diameter portions of the cavities in contact with the circumferential flanges 20—20 to form a pair of closed chambers 22—22 having precisely similar geometric dimensions.

As shown more clearly in Fig. 3, a tapered circular opening 23 is provided in the disc 21 concentric with the central longitudinal axis of the cavity. The tapered opening 23 receives a metallic cylindrical sleeve 24 provided with a corresponding taper. A pair of low resistance conducting members 25 and 26 pass through the tapered cylindrical sleeve 24 and are rigidly supported thereby, in spaced relation with the central longitudinal axis of the cavity, by means of a suitable insulating material 27 completely filling the voids between the conducting members and the sleeve. The insulating material 27 may comprise glass or other material capable of forming a rigid assembly as well as a gas-tight seal between the conducting members and the sleeve. The conducting members 25 and 26 are terminated in the chamber 22 in spaced angular flanges 28 and 29 lying in the central longitudinal axis of the cylindrical cavity. The sensitive element comprises a thin resistance wire 30 having a high temperature coefficient of resistance. The wire 30 is supported between the angular flanges 28 and 29, in stretched relationship, and in precise coincidence with the central longitudinal axis of the cavity. The resistance wires which comprise the sensitive element of each of the convection current devices are constructed of the same material having a high temperature coefficient of resistance and are of equal length and diameter.

The foregoing construction not only provides a rigid thermal conductivity cell capable of withstanding abnormal shock and vibration, but readily allows manufacture of a plurality of identical cells with absolute precision.

The circuit diagram of the convection current responsive instrument described heretofore is shown in Fig. 4 of the drawings. The sensitive elements of the thermal conductivity cells are interconnected, by connections between their supporting members, to form a resistance bridge circuit 31. The bridge circuit 31 includes resistance arms 32 and 33 corresponding to the sensitive elements of the thermal conductivity cells lying in the plane passing through line A—A of Fig. 1, and resistance arms 34 and 35 which correspond to the sensitive elements of the cells lying in the plane passing through the line B—B. The bridge circuit is energized with alternating or direct current from a supply 36, while conditions of unbalance thereof are indicated by a suitable current responsive meter 37, and output potentials thereof are applied to a utilization circuit 38, which, for example, may comprise a follow-up system for maintaining an element stabilized about the sensitive axis.

Upon energization of the bridge circuit equal current flow is established in each of its resistance arms since the sensitive elements of the condutivity cells offer equal resistance. Therefore, bridge energization maintains the sensitive elements at a similar temperature level so that the same convection current source is established in each cell. When the instrument occupies a symmetrical position as shown in the drawings, the convection currents equally effect the temperature of the sensitive elements and the bridge circuit remains in a balanced condition.

However, when the instrument rotates about the sensitive axis Z—Z, the effective intensity of the convection currents within the thermal conductivity cells located to the left of the vertical axis Y—Y as viewed in the drawing, increase or decrease, thereby increasing or decreasing the temperature of the sensitive elements of these cells, depending on the magnitude and direction of deviation, whereas the sensitive elements of the thermal conductivity cells located to the right of the vertical axis are equally but oppositely effected. Consequently, upon rotation of the instrument about its sensitive axis, the resistance of the bridge arms 32 and 34 will equally increase or decrease on the one hand, and the resistance of the bridge arms 33 and 35 will equally decrease or increase, on the other hand, respectively. Such changes in the resistance of the bridge arms unbalance the bridge circuit and the meter 37 produces an indication of the instrument deviation as a function of current flow. Since the sensitive elements have a high temperature coefficient of resistance small temperature variations thereof will be manifest by appreciable changes in their resistance. The instrument is therefore capable of indicating minute deviations and providing amplifiable output signals. In the case of direct current energization the sense of the deviation is determined by the polarity of the output potential, whereas sense is manifest by a phase difference when an alternating current source is coupled to the bridge circuit.

The instrument is only sensitive to rotation about the axis Z—Z, and no output potential is produced in response to rotation of the instrument about its vertical axis Y—Y or about its horizontal axis X—X. For in the former case, all of the thermal conductivity cells are equally effected by any change in convection current intensity, while in the latter situation, similar temperature changes in the sensitive elements of the cells mounted in the plane of line B—B are equal and opposite to temperature changes in the sensitive elements of the cells positioned in the plane of line A—A.

Although the preferred embodiment of the present invention has been disclosed and described heretofore as comprising two pairs of thermal conductivity cells it is to be expressly understood that only one pair of thermal conductivity cells, arranged in the manner shown in Fig. 2, for example, may be employed. In such case the sensitive elements are connected in bridge circuit arrangement with two equal resistors replacing the sensitive elements of the second pair.

The advantageous results manifest from utilization of two pairs of cells, versus one pair, comprises a hundred per cent increase in the useful output potential, thus allowing a substantial reduction in size of the conductivity cells, with a corresponding increase in rigidity and utility. The allowable reduction in length of the sensitive elements is especially advantageous, since structurally, they are the most sensitive of all the cell components, and a substantial reduction in the length thereof provides an instrument affording greater stability. The novel design and construction features of the thermal conductivity cells described heretofore, allowing precisional duplication of cells, nullifies an increase in error which would result by doubling the number of non-identical conductivity cells.

As mentioned heretofore, it is another object of the present invention to provide means to compensate for errors in deviation indications resulting from spurious forces applied to the instrument in the direction of its sensitive axis. In view of the instrument's non-sensitivity to deviations about the vertical and horizontal axes, spurious forces applied to instrument in the direction of rotation about such axes will not effect the indication.

As shown in Fig. 2 of the drawings, the foregoing means comprises a gas-filled reservoir 40 provided by a cylindrical bore in the housing 11 having a longitudinal axis lying in the plane of the longitudonal axes of the cavities 14, 15. A pair of small diameter conduits 41 and 42 are drilled in the housing 11, in axial alignment with the central longitudinal axes of the cavities 14 and 15, to provide a gas path between the chambers 22—22 and opposite ends of the reservoir 40. It is to be expressly understood that a gas reservoir and connecting conduits are associated with each pair of thermal conductivity cells included within the instrument 10. However, a single reservoir of sufficient volumetric size may be readily employed having pairs of conduits connected to each end thereof feeding separate cells of each pair of cells.

When a spurious force is applied to the instrument, such as upon acceleration of the instrument from left to right as viewed in Fig. 2, the convection currents within the cells are deviated to thereby increase the temperature of the sensitive elements of the left hand cells and decrease the temperature of the sensitive elements in the right hand cells and thus unbalance the bridge proportionately to the acceleration. Since the gas within the reservoir 40 is subject to the same acceleration, a pressure differential is established at the opposite ends of the reservoir 40 producing an increase in gas pressure in the left hand cells and a decrease in gas pressure in the right hand cells. Inasmuch as convection current intensity varies directly with gas pressure, proper variation of gas pressure within the cells fully compensates for temperature variations of the sensitive elements resulting from convection current deviations due to acceleration.

An increase in gas pressure within a thermal conductivity cell has a substantially greater effect on the sensitive element temperature than deviation of the convection currents under conditions of constant prssure. Therefore, slight gas pressure variations compensates for substantial filament temperature variation resulting from deviation of the convection currents. Furthermore, since the inertia of a volume of gas is directly proportional to its molecular weight and inversely proportional to its absolute temperature, the gas within the thermal conductivity cells is effected to a lesser degree upon acceleration of the instrument than the gas within the reservoir 40. In view of the foregoing considerations, it is to be expressly understood that a reservoir containing a volume of gas sufficient to compensate for convection current deviation resulting from high magnitude acceleration may be incorporated within the instrument without increasing the external dimensions of the housing 11. Moreover, by properly proportioning the reservoir volume and the capacities of the conduits feeding the cells therefrom, precise compensation may be obtained throughout a wide range of acceleration forces.

There is thus provided by the present invention a novel convection current responsive instrument for producing an absolute indication of only a single preselected function. The instrument preferably includes two pairs of convection current devices of novel design allowing precisional construction thereof so that a balancing circuit arrangement may be employed to render the instrument only responsive to deviations about one predetermined axis. The present invention also provides novel means compensating for the effects of spurious forces applied to the instrument in a direction of its sensitivity, such as acceleration or shock forces.

Although several embodiments of the present invention have been described and disclosed herein it is to be expressly understood that various changes and substitutions may be made therein without departing from the spirit of the invention as well understood by those skilled in the art. Reference therefore will be had to the appended claims for a definition of the limits of the invention.

The invention described herein may be manufactured and used by or for the Government of the United States of America for governmental purposes without the payment of any royalties thereon or therefor.

What is claimed is:

1. A measuring instrument comprising a pair of similar convection current means of the type including a gas-filled cylindrical cavity structure and an electrically heated resistance wire lying in the longitudinal axis of the cavity structure, means mounting the convection current means with the longitudinal axes thereof lying in a common plane equally disposed about a common axis, a gas-filled reservoir symmetrically positioned in said common plane, means forming a gas connection from spaced points of said reservoir to said cavity structures through conduits axially aligned with said longitudinal axes, and means producing an output potential as a function of the resistance values of said resistance wires.

2. A measuring apparatus comprising two pairs of thermal conductivity cells, means mounting the pairs in spaced parallel planes with the cells of each pair equally inclined toward each other symmetrically about the vertical axis of the apparatus, circuit means interconnecting said cells to produce an output potential in response to deviations of the apparatus about an axis perpendicular to the spaced parallel planes from a position wherein the cells of each pair are equally disposed about the vertical axis, gas-filled reservoir means mounted in fixed relation with said cells, and means forming gas-connections between the reservoir means and each cell of said pairs.

3. A measuring apparatus comprising two pairs of thermal conductivity cells, means mounting the pairs in spaced parallel planes with the cells of each pair equally inclined toward each other symmetrically about the vertical axis of the apparatus, circuit means interconnecting said cells to produce an output potential in response to deviations of the apparatus about an axis perpendicular to the spaced parallel planes from a position wherein the cells of each pair are equally disposed about the vertical axis, a gas-filled reservoir associated with each of said pairs, and conduit means forming gas-connections between the cells of each pair to spaced points of the reservoir associated therewith.

4. A measuring apparatus comprising four thermal conductivity cells, each of said cells including a gas-filled cylindrical cavity structure and an electrically heated resistance wire positioned therein coincidentally with the longitudinal axis thereof, means mounting said cells in pairs lying in spaced parallel planes with the cells of each pair equally inclined on opposite sides of a plane perpendicular to said spaced planes, a gas-filled reservoir lying in each plane of said parallel planes, and means forming gas-connections between the cells of each pair of cells to spaced points of the reservoir lying in the plane thereof through gas conduits axially aligned with the longitudinal axes of the cavity structures.

5. A measuring instrument comprising a pair of gas-filled conductivity cells connected to circuit means producing an output potential in response to differential deviations of the convection currents of the cells, and means compensating for convection current deviation of the instrument in a given direction, said last named means including an elongated gas-filled reservoir having its longitudinal axis extending in said given direction and having its opposite ends connected one to each of the cells.

6. A measuring instrument comprising a pair of gas-filled conductivity cells spaced apart and connected to circuit means producing an output potential in response to differential deviations of the convection currents of the cells, and an elongated gas-filled reservoir having its longitudinal axis extending in the direction of the spacing of the cells and having its opposite ends connected one to each of the cells.

CLARKE C. MINTER.

REFERENCES CITED

The following references are of record in the file of this patent:

UNITED STATES PATENTS

| Number | Name | Date |
|---|---|---|
| 2,455,394 | Webber | Dec. 7, 1948 |
| 2,478,956 | Webber | Aug. 16, 1949 |